US008686669B2

(12) United States Patent
Dirkx et al.

(10) Patent No.: US 8,686,669 B2
(45) Date of Patent: Apr. 1, 2014

(54) METHOD AND APPARATUS FOR CONTROLLING A LINEAR MOTION SYSTEM

(75) Inventors: Walrick Dirkx, Eindhoven (NL); Wilco Pancras, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 13/127,035

(22) PCT Filed: Oct. 23, 2009

(86) PCT No.: PCT/EP2009/007590
§ 371 (c)(1),
(2), (4) Date: Sep. 7, 2011

(87) PCT Pub. No.: WO2010/049098
PCT Pub. Date: May 6, 2010

(65) Prior Publication Data
US 2011/0309775 A1 Dec. 22, 2011

(30) Foreign Application Priority Data
Oct. 31, 2008 (EP) .................................. 08019066

(51) Int. Cl.
*H02K 41/03* (2006.01)
(52) U.S. Cl.
CPC ..................................... *H02K 41/03* (2013.01)
USPC ............ 318/135; 318/560; 318/671; 318/687
(58) Field of Classification Search
CPC .................................................... H02K 41/03
USPC .................. 318/135, 687, 671, 560
See application file for complete search history.

(56) References Cited

U.S. PATENT DOCUMENTS

| | | | | |
|---|---|---|---|---|
| 5,801,462 A | * | 9/1998 | Yagoto et al. | 310/12.19 |
| 6,831,379 B2 | * | 12/2004 | Ohto et al. | 310/12.18 |
| 7,786,685 B2 | * | 8/2010 | Schueren | 318/135 |
| 7,799,704 B2 | * | 9/2010 | Park et al. | 438/778 |

FOREIGN PATENT DOCUMENTS

| | | |
|---|---|---|
| DE | 3900511 | 7/1990 |
| JP | 55002273 | 1/1980 |
| JP | 2001317604 | 11/2001 |
| JP | 2004229396 | 8/2004 |
| JP | 2005228881 | 8/2005 |

OTHER PUBLICATIONS

PCT International Search Report corresponding to PCT Application No. PCT/EP2009/007590, mailed Jun. 17, 2010 (3 pages).
EP Search Report corresponding to European Application No. 08019066.3, mailed Jun. 16, 2009 (3 pages).

\* cited by examiner

*Primary Examiner* — Bentsu Ro
*Assistant Examiner* — David Luo
(74) *Attorney, Agent, or Firm* — Maginot, Moore & Beck

(57) ABSTRACT

A method of controlling a linear motion system has a linear synchronous motor comprising a stator and at least two carrier units moveable in relation to the stator, the stator comprising a number of coil units, each of the at least two carrier units comprising a magnetic unit including an array of alternate-pole magnets having a regular magnet pole-pitch, wherein in order to form a train the at least two carrier units are arranged relative to each other so that the mutual distance between two identically poled magnets of two different magnetic units is an integer multiple of the magnet pole-pitch.

13 Claims, 2 Drawing Sheets

5: Coils
7: Sensor Devices
10a: First Product Carrier
10b: Second Product Carrier
30a-30b: Coil Units
40: Detail View 1: Linear Motion System
2: Transport Circuit
2a-2d: Transport Segments
10a-10k: Product Carriers 5a-5c: Coils
6a-6b: Magnetic Units
6a', 6a", 6b', 6b": Alternating Poled Magnets
7a-7c: Sensor Devices
7b', 7b", 7c', 7c": Sensor Units
10a-10b: Product Carriers
30a-30c: Coil Units
P: Magnet Pole-Pitch

METHOD AND APPARATUS FOR CONTROLLING A LINEAR MOTION SYSTEM

This application is a 35 U.S.C. §371 National Stage Application of PCT/EP2009/007590, filed Oct. 23, 2009, which claims the benefit of priority to Serial No. 08019066.3, filed Oct. 31, 2008 in Europe, the disclosures of which are incorporated herein by reference in their entirety.

FIELD OF THE INVENTION

The disclosure relates to a method and an apparatus for controlling a linear motion system having a linear synchronous motor, to a corresponding computer program, and to a corresponding computer program product.

BACKGROUND

Linear synchronous motors comprise a longitudinal stator on which at least one translator is freely moveable. A magnetic travelling-field is generated for moving the translator(s). The stator includes separate coil units, each comprising at least one coil. Usually, the magnetic travelling-field is generated by applying a three-phase current to said coil units. One example of a well known linear motor is disclosed in DE 39 00 511 A1. A current with variable frequency and amplitude is applied to the coil units of the longitudinal stator depending on the actual location of the translator, in order to move the translator relative to the stator.

NL 1024992 discloses a prior art linear motion system, which comprises an apparatus for moving carriers in a circulating transport circuit using magnetic movement devices, which comprise magnetic units working together and controllable coil units. Such an apparatus is often used in automated and specific product facilities, where a product is placed on the product carrier. During the circulation through the transport circuit, the product has to undergo several similar process steps. An application of such an apparatus relates to a semiconductor substrate placed on a product carrier, where various ultra-thin layers are to be deposited (e.g. chemical or physical vapour deposition CVD/PVD).

In such an application field, precise control of the movement of the various product carriers through the circulating transport circuit is essential for the correct performance of the various process actions on the products placed on the product carriers. Magnetic movement devices are used to move the product carriers through the transport circuit, particularly where very high requirements are set for the accuracy of the various process actions, such as the placement of an electronic component or the deposition of a semiconductor layer on a substrate.

The actuation occurs without contact between stator and translator, and without detrimental influences that can disturb the movement of the product carriers through the transport circuit, with the possibility to manipulate different product carriers independently of each other. The apparatus corresponding to the prior art comprises sensor devices, which are provided to detect the magnets of one product carrier and on the basis thereof to generate a position signal of the product carrier. This detection signal is used to activate the movement devices for the accurate positioning of the product carrier in the transport circuit. This, in combination with the independently controllable coil units, allows for an activation of each product carrier separately and for movement/position of each product carrier independently of the other product carriers.

In view of this prior art, it is an object of the disclosure to provide a method and an apparatus for controlling such a linear motion system so that a train comprising at least two carriers can be formed.

According to the disclosure a method and an apparatus for controlling a linear motion system, further a corresponding computer program and a computer program product, according to the independent claims are provided. Advantageous embodiments are defined in the dependent claims.

SUMMARY

The disclosure provides a method for forming a train comprising at least two carrier units which can be moved as a single unit. Therefore, e.g. during a CVD process the room required for a process chamber can be reduced. Especially, forming a train of carrier units according to the disclosure can used advantageously for moving the carriers through a process station which deposits material at high temperature. The smaller this oven, the cheaper in production and the smaller the machine footprint. In addition, less chemicals are needed, since the carrier units cover a larger areas. Another exemplary application, wherein the disclosure can be implemented advantageously is the sputtering process for the production of hard discs. Running the carriers in train formation allows for a 'spray-paint'-type of processing, required for next-generation hard discs. The current state of the art is that a carrier moves into a process chamber, stops, gets processed, and leaves. The 'spray-paint'-way of processing is faster, as the carrier is moved through the chamber at continuous speed and get processed during the movement. This can be done without requiring any buffers when the train formation is available. Furthermore, the disclosure can advantageously be used for logistic or transport systems. Especially, it is possible to provide local buffering on the track using a train formed by carriers.

According to the disclosure, a method of controlling a linear motion system having a linear synchronous motor comprising a stator and at least two carrier units moveable in relation to said stator is disclosed. Said stator comprises a number of coil units, each of said at least two moveable carrier units comprising a magnetic unit including an array or a series of alternate-pole magnets having a regular magnet pole-pitch, i.e. said alternate-pole magnets are arranged so that the distance between two neighbouring identically poled magnets is constant. This distance is defined as the magnetic pole-pitch. Within said series of alternate-pole or alternatingly poled magnets, the magnets are arranged so that the north pole of the first magnet lies adjacent to the south pole of the second magnet, which in turn lies adjacent to the north pole of the third magnet etc.

In order to form a train said at least two carrier units are arranged relative to each other so that the mutual distance between two identically poled magnets of two different magnetic units is an integer multiple of the magnet pole-pitch.

According to a preferred embodiment, said train is moved along the stator by applying a current to the stator coil units, said current corresponding to a current being applied to the stator coil units in order to move a single carrier unit. As the carrier units forming a train are arranged so that the distance of identically poled magnets equals the magnetic pole-pitch, the carrier units forming the train advantageously appear as one carrier unit and thus can be controlled as one carrier unit (i.e. the train).

According to a preferred embodiment, the stator coil unit includes at least one sensor for determining the position of a carrier unit, and at least one coil for moving the carrier unit.

The sensors can be magnetic sensors (e.g. Hall sensors) for detecting the magnetic field of the carrier magnetic units. This embodiment allows for a accurate determination of the current position of the carrier unit. For further details, NL 1024992 is referred to in its entirety.

Advantageously, a train is formed by a first carrier unit being positioned over a first coil unit and a second carrier unit being positioned over a second coil unit with said second coil unit being adjacent to said first coil unit, so that the mutual distance between two identically poled magnets of the magnetic units of said first and second carrier units, respectively, is an integer multiple of the magnet pole-pitch. Thus, a train can easily be formed, while two carrier units are controlled by two separate coil units. If the setpoint of the first carrier unit is determined in such a way that this carrier unit enters the second coil unit that controls the second carrier, with the correct velocity and mutual distance, a smooth train is formed.

Appropriately, said train is moved along said stator by a current being applied to a coil unit below said train, said current commutation being calculated for only one of said carrier units forming said train. Thus, once having formed said train as described above, said train can be moved like a single carrier unit due to the correct distance of the magnets of adjacent carrier units.

According to a preferred embodiment, while said train passes from a first coil unit to a second coil unit, the current commutation is calculated for a first carrier unit being positioned over said first coil unit, then for said first and said second coil unit carrier unit being positioned over said first coil unit, and then for said first carrier unit being positioned over said second coil unit. Therefore, the train can easily be moved along the stator by applying a travelling-current to adjacent coil units.

Advantageously, a train is formed and moved through the process chamber of a wafer coating process, especially a semiconductor depositing process such as CVD or PVD. The present disclosure can advantageously be implemented in wafer coating processes, as there is the need to move carrier units slowly, continuously and with the same speed through the process chambers. By forming a train these objects can be accomplished. Furthermore, the space needed for the process chamber(s) can be reduced and the track inside the chamber can be covered by the carrier units forming a train and thus can be protected from being coated.

An inventive apparatus performs all steps of the inventive method.

An inventive computer program comprising program code means is configured to perform all steps of the inventive method, when the computer program is executed on a computer or a corresponding processing unit, in particular on an inventive apparatus.

An inventive computer program product comprising program code means stored on a computer readable data carrier is provided for performing the inventive method, when the computer program is executed on a computer or a corresponding processing unit, in particular on an inventive apparatus.

Further advantages and embodiments of the disclosure will become apparent from the description and the appended figures.

It should be noted that the previously mentioned features and the features to be elucidated in the following are usable not only in the respectively indicated combination, but also in further combinations or taken alone, without departing from the scope of the present disclosure.

BRIEF DESCRIPTION OF THE DRAWINGS

Like parts are indicated with identical reference numbers in the description below for a better understanding of the disclosure.

DETAILED DESCRIPTION

Figure 1:
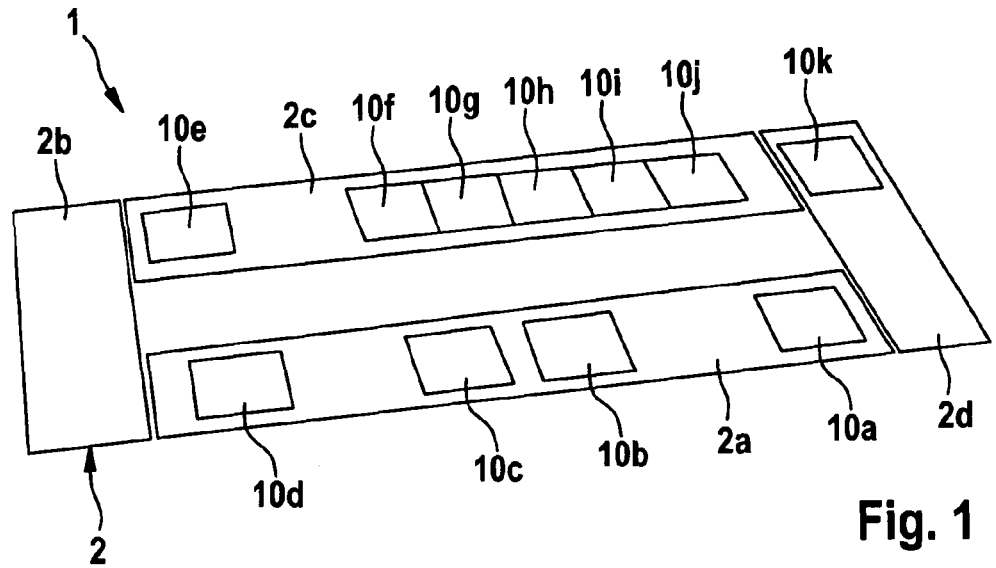
FIG. 1 shows a schematic plan view of a linear motion system suitable for use with the present disclosure.

FIG. 1 shows a schematic plan view of a linear motion system (LMS) suitable for use with the present disclosure. LMS 1 comprises a frame that forms a transport circuit 2, including different stators being formed as transport segments 2a, 2b, 2c and 2d. Various product carrier units 10a-10k are placed movably above the circulating transport circuit 2a-2d.

Various products (not shown) can be placed on the product carriers 10a-10k, which can undergo various process steps during the circulating movement through the transport circuit 2. For example, the products placed on the product carrier 10a-10k can include electronic printed boards, on which the various electronic components must be placed. In another application, the products can be semiconductor substrates, whereon various thin metallic or semiconductor layers are deposited during various processing steps, e.g. the manufacture of solar cells, chips, or LEDs.

Figure 2:
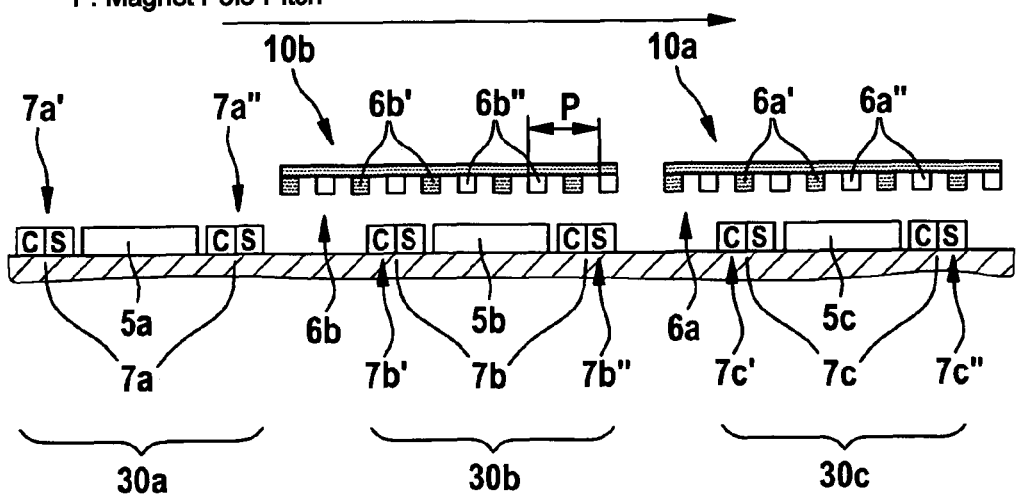
FIG. 2 shows a schematic side view of the linear motion system of FIG. 1.

FIG. 2 shows a schematic side view of a detail of the linear motion system of FIG. 1 including magnetic based transport devices. For this purpose, a number of coil units 30a, 30b, 30c, etc. including coils 5a, 5b, 5c, etc. and sensor units 7a, 7b, 7c, etc., respectively, are installed in the transport circuit 2 and in the transport direction of the product carriers 10a-10k. The coil units 30a, 30b, 30c, etc. interact with magnetic units 6a, 6b, etc, which have been fitted on each product carrier 10a, 10b, etc. The magnetic units 6a, 6b, etc, are composed of an array or a series of alternating poled magnets. The alternating poled magnets of each magnetic unit 6a, 6b, etc. on each product carrier are designated 6a', 6a" (for product carrier 10a); 6b', 6b" (for product carrier 10b); etc.

By sequentially activating the coil units 30a, 30b, 30c, etc. in a specific way, the product carriers 10a, 10b, etc. are moved through the transport circuit 2 by commutation and the magnetic action of the various alternating poled magnets (attraction and repulsion). The actuation therefore occurs without contact, which improves the accuracy of the process actions that must be performed on the products placed on the product carriers 10a, 10b, etc.

In order to provide an improved and more versatile LMS, which is able to manipulate various product carriers 10a, 10b, etc. independently of each other and more particularly, to position them more accurately for the process actions to be performed, sensor devices 7a, 7b, 7c, etc. are provided, which are equipped to detect the presence and position of a product carrier 10a, 10b, etc. The sensor devices 7a, 7b, 7c, etc. are composed of various sensor units 7a', 7a", 7b', etc., which in this example are arranged, viewed in the transport direction of the product carriers, before and after a coil 5a, 5b, 5c, etc. As shown in FIG. 2, each sensor unit 7a', 7a", 7b', etc. of the sensor devices 7a, 7b, 7c comprises two Hall sensors C and S.

The sensor units 7a', 7a", 7b', etc. generate a detection signal, when a product carrier 10a, 10b, etc. passes under the influence of the sequential series of the alternatingly poled magnets with the movement/position of the product carrier. The detection signal is, for example, a voltage signal and, due to the two Hall sensors C and S used, both generate a sine-derived voltage signal with a mutual phase difference. This phase difference depends on the mutual distance between the Hall sensors C and S. In particular, this distance equals one quarter of the distance P (pole-pitch)+an integer multiple of half the distance P between successive identically poled magnets.

The voltage signal respectively induced by the alternatingly poled magnets, which is generated by each of the Hall sensors C and S, on the one hand provides information concerning the direction of the moved product carrier and on the other hand is a measure of the position of the product carrier with respect to these Hall sensors (and therefore to the corresponding coil unit). This information can advantageously be used to form a train as described below.

Figure 3:
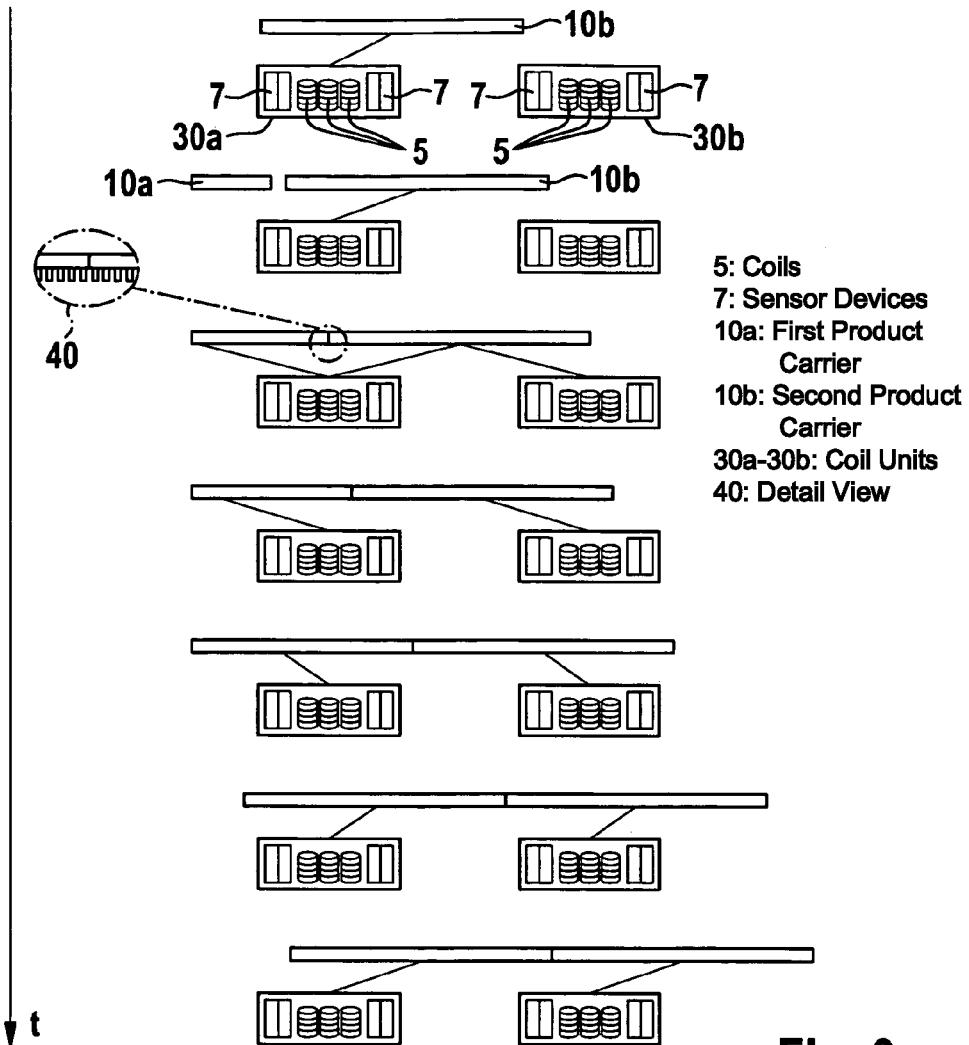
FIG. 3 shows a schematic side view of a linear motion system with two carriers forming a train according to an embodiment of the disclosure.

FIG. 3 shows a flow diagram, wherein over time t two carriers 10a, 10b form a train and said train is moved as a single unit. In the diagram, subsequent views are arranged vertically along the time axis t according to their point in time.

Firstly, a single carrier unit 10b is arranged above a coil unit 30a. The coil unit 30a comprises a number of coils 5 and a number of sensors 7 as described above. A three-phase travelling-current is applied to the coils 5 in order to move the product carrier units.

Then, a second carrier unit 10a approaches the first carrier unit 10b from the left. As shown in area 40 (cf. FIG. 4), the carrier unit 10a is arranged relative to the carrier unit 10b so that the mutual distance of two identically poled magnets is an integer multiple of the magnet pole-pitch. Thus, a train is formed. Once the carrier unit 10a has reached its train forming position, the resulting train 20 is moved as a single unit by the coil units 30a, 30b.

In order to move the train to the right, the carrier unit 10b is moved to the right by the coil unit 30a until it reaches the coil area of the coil unit 30b. Simultaneously, the carrier unit 10a is moved to the right by the coil unit (not shown) to the left of the coil unit 30a until it reaches the coil area of the coil unit 30a. At this point in time, the carrier unit 10b is controlled by both magnetic units 30a and 30b, whereas the carrier unit 10a is controlled by the coil unit (not shown) to the left of the coil unit 30a and is only indirectly controlled by the coil unit 30a due to the same commutation. So to say, the carrier unit 10a is hitched to the carrier unit 10b above the coil unit 30a, due to the defined mutual distance D, whereby the current applied to the coil unit 30a, which is calculated for the carrier unit 10b, is also suitable to move the carrier unit 10a.

Subsequently, the train moves to the right and the carrier units 10a, 10b leave the coil area of their respective underlying coil units. At this point in time, the control of the carrier units 10a, 10b is changed so that the carrier unit 10b is controlled by the coil unit 30b and the carrier unit 10a is controlled by the coil unit 30a. It is understood that the current applied to the coil units 30a and 30b, respectively, is suitable to maintain the train formation.

Over time, the train is moved further to the right until the carrier unit 10a reaches the coil area of the coil unit 30b and the carrier unit 10b reaches the coil area of a coil unit (not shown) to the right of the coil unit 30b. Then, the procedure is repeated as described above, if required.

Figure 4:
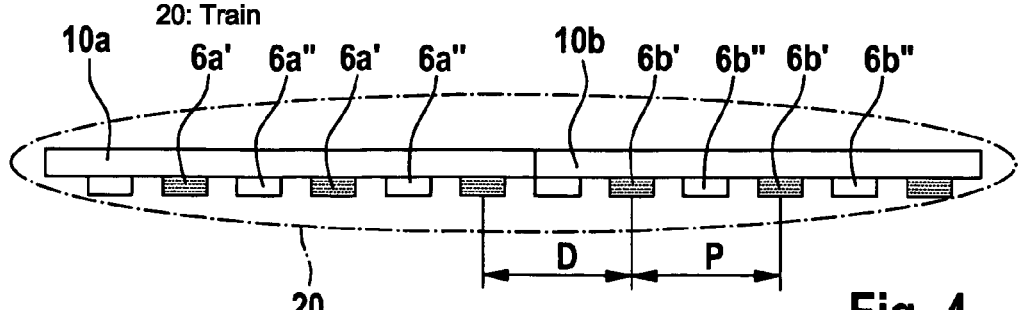
FIG. 4 shows a magnified detail of FIG. 3.

FIG. 4 shows a magnified view of detail 40 of FIG. 3, wherein the two carriers 10a, 10b form a train 20. Each carrier comprises alternatingly poled magnets 6a', 6a'' and 6b', 6b'', respectively. In order to form the train 20, the carrier units 10a and 10b are arranged relative to each other so that the mutual distance D between two identically poled magnets 6a' and 6b' is an integer multiple of the magnet pole-pitch P, in the shown embodiment D=P.

The described steps of the method according to the disclosure may be performed in combination, in different order or alone. Use of the method is not limited to the field of semiconductor coating and the scope of the disclosure is only limited by the appended claims.

The invention claimed is:

1. A method of controlling a linear motion system having a linear synchronous motor comprising a stator and at least two carrier units moveable in relation to said stator,
    said stator comprising a number of coil units,
    each of said at least two carrier units comprising a magnetic unit including an array of alternate-pole magnets having a regular magnet pole-pitch,
    wherein in order to form a train said at least two carrier units are arranged relative to each other so that the mutual distance between two identically poled magnets of two different magnetic units is an integer multiple of the magnet pole-pitch,
    wherein a train is formed by a first carrier unit being positioned over a first coil unit, and a second carrier unit being positioned over a second coil unit adjacent to said first coil unit, so that the mutual distance between two identically poled magnets of the magnetic units of said first and second carrier units, respectively, is an integer multiple of the magnet pole-pitch, and
    wherein said train is moved along said stator by a current being applied to a coil unit under said train, said current commutation being calculated for only one of said carrier units forming said train.

2. A method according to claim 1, wherein said train is moved along the stator by applying a current to said stator coil units, said current corresponding to a current being applied to said stator coil units in order to move a single carrier unit.

3. A method according to claim 1, wherein said stator coil unit includes at least one sensor for determining the position of at least one of said carrier units, and at least one coil for moving at least one of said carrier units.

4. A method according to claim 1, wherein, while said train passing from said first coil unit to said second coil unit, said current commutation is calculated for said first carrier unit being positioned over said first coil unit, then said current commutation is calculated for said first carrier unit being positioned over said first coil unit and said second coil unit, and then said current commutation is calculated for said first carrier unit being positioned over said second coil unit.

5. A method according to claim 1, wherein a train is formed and moved through the process chamber of a wafer coating process such as CVD, PVD, sputtering-process and/or Plasma Enhanced CVD, especially a semiconductor depositing process.

6. The method according to claim 1, wherein all steps of the method are performed with a computer program comprising program code means when the computer program is executed on a computer or a corresponding processing unit.

7. The method according to claim 1, wherein all steps of the method are performed with a computer program product comprising program code means stored on a computer readable data carrier when the computer program is executed on a computer or a corresponding processing unit.

8. A method of controlling a linear motion system having a linear synchronous motor including (i) a stator having a plurality of coil units, (ii) a first carrier unit moveable in relation to said stator, and (iii) a second carrier unit movable in relation to said stator, the method comprising:
    forming a train by moving the first carrier unit relative to the second carrier unit; and arranging the first carrier unit and the second carrier unit to form the train such that magnets of a first array of alternating pole magnets, which have a regular magnet pole-pitch, of a first magnetic unit of the first carrier unit and magnets of a second array of alternating pole magnets, which have the regular magnet pole-pitch, of a second magnetic unit of the second carrier unit are separated from one another by a mutual distance, which is an integer multiple of the regular magnet pole-pitch.

9. A method according to claim 8, further comprising:
applying a train current to said stator coil units to move said train along the stator, said train current corresponding to a current applied to said stator coil units in order to move a single carrier unit.

10. A method according to claim 8, further comprising:
determining a position of at least one of the first carrier unit and the second carrier unit with a sensor on the plurality of stator coil units, and
moving at least one of the first carrier unit and the second carrier unit with at least one coil of the plurality of coil units.

11. A method of controlling a linear motion system having a stator, a first carrier unit movable in relation to said stator, and a second carrier unit movable in relation to said stator, comprising:
positioning the first carrier unit, which includes a first magnetic unit having a first array of alternating pole magnets with a regular magnet pole pitch, over a first coil unit of the stator; and
positioning the second carrier unit, which includes a first magnetic unit having a first array of alternating pole magnets with the regular magnet pole-pitch, over a second coil unit of the stator to form a train,
wherein the first coil unit is adjacent to the second coil unit, and
wherein the first and second carrier units are positioned over the first and second coil units to form the train in such a way that a mutual distance between magnets of the first magnetic unit having a first pole and magnets of the second magnetic unit having the first pole is an integer multiple of the regular magnet pole-pitch.

12. A method according to claim 11, further comprising:
applying a current commutation to one of the first coil unit and the second coil unit under said train to move the train, the current commutation being calculated for only one of said first and second carrier units forming said train.

13. A method according to claim 12, further comprising:
while said train is passing from said first coil unit to said second coil unit, (i) calculating said current commutation for said first carrier unit being positioned over said first coil unit, then (ii) calculating said current commutation for said first carrier unit being positioned over said first coil unit and said second coil unit, and then (iii) calculating said current commutation for said first carrier unit being positioned over said second coil unit.

* * * * *